US007618908B2

(12) United States Patent
Borrelli et al.

(10) Patent No.: US 7,618,908 B2
(45) Date of Patent: *Nov. 17, 2009

(54) VISIBLE LIGHT OPTICAL POLARIZER MADE FROM STRETCHED $H_2$-TREATED GLASS

(75) Inventors: Nicholas Francis Borrelli, Elmira, NY (US); David John McEnroe, Corning, NY (US); Joseph Francis Schroeder, III, Corning, NY (US)

(73) Assignee: Corning Incorporated, Corning, NY (US)

( * ) Notice: Subject to any disclaimer, the term of this patent is extended or adjusted under 35 U.S.C. 154(b) by 729 days.

This patent is subject to a terminal disclaimer.

(21) Appl. No.: 11/314,874

(22) Filed: Dec. 20, 2005

(65) Prior Publication Data

US 2007/0141350 A1      Jun. 21, 2007

(51) Int. Cl.
C03C 4/00 (2006.01)
C03C 3/089 (2006.01)
G02B 5/30 (2006.01)

(52) U.S. Cl. ............................ 501/19; 501/13; 501/65; 501/66; 501/67; 359/492

(58) Field of Classification Search .................. 501/13, 501/65, 66, 67, 19; 359/492
See application file for complete search history.

(56) References Cited

U.S. PATENT DOCUMENTS

| 2,319,816 | A | 4/1943 | Land et al. ................. 88/65 |
| 3,653,863 | A | 4/1972 | Araujo et al. ................. 65/30 |
| 4,017,316 | A | 4/1977 | Renkey et al. ................. 106/15 |
| 4,057,408 | A | 11/1977 | Pierson et al. ................. 65/18 |
| 4,125,404 | A | 11/1978 | Araujo et al. ................. 106/54 |
| 4,125,405 | A | 11/1978 | Araujo et al. ................. 106/54 |
| 4,188,214 | A | 2/1980 | Kido et al. ................. 430/494 |
| 4,282,022 | A | 8/1981 | Lo et al. ................. 65/85 |
| 4,304,584 | A | 12/1981 | Borrelli et al. ................. 65/30 |
| 4,479,819 | A | 10/1984 | Borelli et al. ................. 65/30.11 |
| 4,792,535 | A | 12/1988 | Fine ................. 501/66 |
| 5,045,509 | A | 9/1991 | Kiefer ................. 501/59 |

(Continued)

FOREIGN PATENT DOCUMENTS

EP      0719741 B1     5/1998

(Continued)

OTHER PUBLICATIONS

"Selective Polarization of Light Due to Absorption by Small Elongated Silver Particles in Glass" S. D. Stookey, et al. Applied Optics, May 1968, vol. 7, No. 5, pp. 777-780.

Primary Examiner—Karl E Group
(74) Attorney, Agent, or Firm—Walter M. Douglas

(57) ABSTRACT

The invention is directed to a method for preparing visible light optical polarizers using a non-halide silver salt and any glass composition that the non-halide silver salts is soluble, provided that the glass composition, including the silver salt, was a halide content that is, on a molar basis, 10% or less than the silver content, on a molar basis, of the glass composition. The silver containing glass is hydrogen reduced prior to stretching to form an optical polarizer. The invention enables one to form a visible light polarizer having a polarizing layer thickness in the range 10-40 μm in which the silver particles have a surround index sufficiently removed from the blue polarizer region to allow good contrast.

3 Claims, 5 Drawing Sheets

U.S. PATENT DOCUMENTS

| | | | | |
|---|---|---|---|---|
| 5,275,979 | A | 1/1994 | Borrelli et al. | 501/13 |
| 5,281,562 | A | 1/1994 | Araujo et al. | 501/32 |
| 5,300,465 | A | 4/1994 | Grateau et al. | 501/13 |
| 5,332,819 | A | 7/1994 | Smothers | 546/94 |
| 5,430,573 | A | 7/1995 | Araujo et al. | 359/361 |
| 5,517,356 | A | 5/1996 | Araujo et al. | 359/490 |
| 5,625,427 | A | 4/1997 | Araujo et al. | 351/159 |
| 5,627,114 | A | 5/1997 | Havens et al. | 501/56 |
| 5,729,381 | A | 3/1998 | Havens et al. | 359/361 |
| 6,298,691 | B1 | 10/2001 | Borrelli et al. | 65/30.1 |
| 6,466,297 | B1 | 10/2002 | Goulding et al. | 349/175 |
| 6,536,236 | B2 | 3/2003 | Grossman et al. | 65/30.11 |
| 6,563,639 | B1 | 5/2003 | Borrelli et al. | 359/486 |
| 6,775,062 | B2 | 8/2004 | Borrelli et al. | 359/492 |
| 6,893,391 | B2 * | 5/2005 | Taylor | 600/37 |
| 7,285,510 | B2 * | 10/2007 | Sakaguchi et al. | 501/68 |
| 7,468,148 | B2 * | 12/2008 | Borrelli et al. | 252/500 |
| 2004/0138044 | A1 * | 7/2004 | Sakaguchi et al. | 501/69 |
| 2007/0093373 | A1 * | 4/2007 | Borrelli et al. | 501/2 |
| 2007/0093374 | A1 * | 4/2007 | Borrelli et al. | 501/2 |
| 2007/0153383 | A1 * | 7/2007 | Borrelli et al. | 359/492 |

FOREIGN PATENT DOCUMENTS

JP  05-208844  8/1993

* cited by examiner

60

VISIBLE LIGHT OPTICAL POLARIZER MADE FROM STRETCHED H₂-TREATED GLASS

FIELD OF THE INVENTION

The invention is directed to visible light optical polarizers, and in particular to thin optical polarizers containing silver in which silver (I) halide particles or crystals are reduced to silver (0) particles in a reducing atmosphere prior to heating and stretching.

BACKGROUND OF THE INVENTION

A polarizing effect can be generated in glasses containing silver, copper or copper-cadmium crystals. These crystals can be precipitated in a boroaluminosilicate glasses having compositions containing suitable amounts of an indicated metal and a halogen other than fluorine.

The polarizing effect is generated in these crystal-containing glasses by stretching the glass and then exposing its surface to a reducing atmosphere, typically a hydrogen containing atmosphere. The glass is placed under stress at a temperature above the glass annealing temperature. This elongates the glass, and thereby elongates and orients the crystals. The shear stress that acts on the particles is proportional to the viscosity of the glass and the draw speed during elongation. The restoring force that opposes the deformation by the shear force is inversely proportional to the particle radius. Hence, the optimum conditions for producing a desired degree of particle elongation and a resulting polarizing effect at a given wavelength involves a complex balance of a number of properties of the glass and the redrawing process. Once the glass has been elongated, the elongated glass article is then exposed to a reducing atmosphere at a temperature above 120° C., but not higher than 25° C. above the annealing point of the glass. This develops a surface layer in which at least a portion of metal halide crystals present in the glass are reduced to elemental silver or copper.

The use of silver halide as a polarizer material capitalizes on two properties of the silver halide that are (1) the liquid particle is very deformable, and (2) it is easier to make larger and controlled particles sizes. The disadvantages of using silver halide are (1) that one cannot make polarizers that operate at wavelengths shorter than red (approximately 650 nm) because of the refractive index of the silver halide and (2) that the process required a hydrogen reduction step. It is possible to stretch metallic silver particles in glass as described by E. H. Land in U.S. Pat. No. 2,319,816 and later by S. D. Stookey and R. J. Araujo in *Applied Optics*, Vol. 7, No. 5 (1968), pages 777-779. However, the problems encountered are the control of particle size and distribution, especially for visible polarizer application where the aspect ratio of the particle is small, typically 1.5-2 to 1.

The production of polarizing glass, as is described in the patent references provided below, broadly involves the following four steps:

1. Melting a glass batch containing a source of silver, copper or copper-cadmium and a halogen other than fluorine, and forming a glass body or form from a melt;
2. Heat treating the glass body at a temperature above the glass strain point to generate halide crystals having a size in the range of 500-2000 Angstroms (Å);
3. Stressing the halide crystal-containing glass body at a temperature above the glass annealing point to elongate the body and thereby elongate and orient the crystals; and
4. Exposing the elongated body to a reducing atmosphere at a temperature above 250° C. to develop a reduced surface layer on the body that contains metal particles with an aspect ration of at least 2:1.

Glass polarizers, the material compositions and the methods for making the glasses and articles made from the glasses have been described in numerous United States patents. Products and compositions are described in U.S. Pat. Nos. 6,563,639, 6,466,297, 6,775,062, 5,729,381, 5,627,114, 5,625,427, 5,517,356, 5,430,573, 4,125,404 and 2,319,816, and in U.S. Patent Application Publication No. 2005/0128588. Methods for making polarizing glass compositions and or compositions containing silver, and/or articles made from polarizing or silver-containing glasses have been described in U.S. Pat. Nos. 6,536,236, 6,298,691, 4,479,819, 4,304,584, 4,282,022, 4,125.405, 4,188,214, 4,057,408, 4,017,316, and 3,653,863. Glass articles that are polarizing at infrared wavelengths have been described in U.S. Pat. Nos. 5,430,573, 5,332,819, 5,300,465, 5,281,562, 5,275,979, 5,045,509, 4,792,535, and 4,479,819; and in non-U.S. patents or patent application publications JP 5-208844 and EP 0 719 741. The Japanese patent publication describes a copper-based polarizing glass instead of a silver-based polarizing glass.

While there have been considerable efforts in the art to improve the polarizing glasses used in optical polarizers and the methods used to make them, there is still considerable need for further improvement. In particular, there is a need for efficient visible light optical polarizers having a polarizing layer thickness in the range of 10-40 μm that can be used in equipment where space is at a premium. It is the object of this invention to provide a polarizing glass, made using non-halide containing silver salts, which can be used for polarizing light in the visible light range of approximately 380-700 nm, and a method of making such glass. It is a further object of this invention to produce a visible light polarizing glass by reducing the silver ion in a glass to silver(0) prior to heat treating and stretching the glass.

SUMMARY OF THE INVENTION

The present invention is directed to a method of making a visible light polarizing glass, the glass being made using silver salts that do not containing halide (non-halide containing silver salts), that can be used for polarizing light having wavelengths in the range of 380-700 nm, the method having a step of reducing silver ion in the glass prior to heat treating and/or drawing the glass to form an optical polarizer. The method of the invention can be used with any halide-free or substantially halide-free glass composition that will allow that will allow a non-halide silver salt to dissolve and exist within the composition as silver oxide or silver(0). A substantially halide-free glass composition is one in which, on a molar basis, the amount of halide is 10% or less than the amount of silver. The method using halide-free salts and H₂ reduction can also be used to make copper(0) containing polarizers effective in the visible light red region.

The invention is further directed to a method of making silver-containing visible light optical polarizers having a polarizing layer thickness in the range of 10-40 μm that can polarize light having a wavelength in the range 380-700 nm.

The invention is also directed to a method of making silver-containing visible light optical polarizers by treating a glass material containing silver ion in a reducing atmosphere for a time in the range of 25-150 hours at a temperature below the softening temperature of the glass. The reducing atmosphere can be any a hydrogen atmosphere or a hydrogen/inert gas atmosphere containing greater than 6% hydrogen. A hydrogen atmosphere is preferred. The exact length of time also depends on the thickness of the glass material being subjected to the reduction step.

The invention is further directed to a silver-containing visible light glass polarizer having a polarizing layer thickness in the range 10-40 μm in which the silver particles have a surround index sufficiently removed from the blue polarizer region to allow good contrast.

The invention is also directed to a method of making a visible light optical polarizer having a polarizing layer of any thickness, the glass being made using silver salts that do not containing halide (non-halide containing silver salts), that can be used for polarizing light having wavelengths in the range of 380-700 nm; the method having a step of reducing silver ion in the glass prior to heat treating and/or drawing the glass to form an optical polarizer, the reduction being carried out such that the depth of the reduced silver layer in the glass before stretching ("Ag⁰–BS") divided by the stretch factor ("SF") gives the thickness of the polarizing layer in the glass after stretching (Ag⁰ Thick–AS).

$$Ag^0\ Thick\text{--}AS = Ag^0\text{--}BS \div SF$$

The method of the invention can be used with any halide-free or substantially halide-free glass composition that will allow that will allow a non-halide silver salt to dissolve and exist within the composition as silver oxide or silver(0). A substantially halide-free glass composition is one in which, on a molar basis, the amount of halide is 10% or less than the amount of silver.

DETAILED DESCRIPTION OF THE INVENTION

Figure 1:
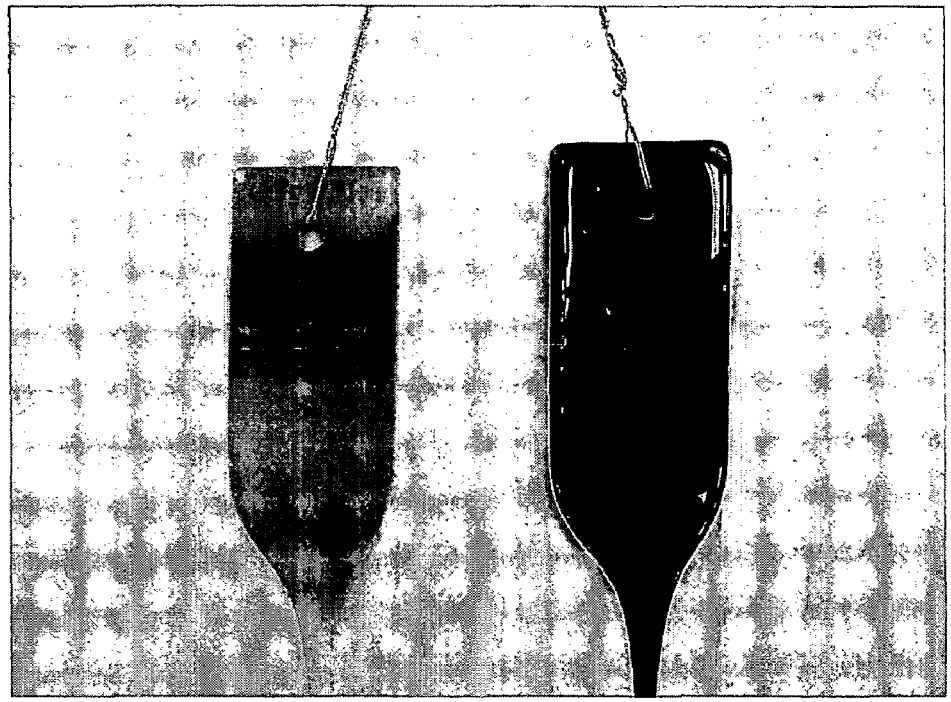
FIG. 1 illustrates visible light polarizer bars with an as-poured bar on the left and a bar after reduction on the right (the dark bar).

The invention is directed to a silver-containing glass visible light optical polarizer operative in the wavelength range approximately 380-700 nm and to a method of making the polarizer. The method of the present invention uses a hydrogen reduction step after a melt containing a silver compound as described below has been prepared, but before the glass is subjected to a stretching step. The method differs from other methods known in the art such as melting silver(0) into bulk glass (with or without a hydrogen reduction step in the process), ion-exchanging Ag⁺¹ into a glass, and melting a silver halide into a glass and hydrogen treating the glass after it has been stretched. The advantage of the present invention is that one has a greater control over the size and the distribution of the silver(0) (i.e., metallic silver) particles that are formed in the glass prior to the glass being stretched to form a visible light optical polarizer. Using the method of the invention, one assures that all the silver is reduced to the depth to which the hydrogen is allowed to penetrate the glass during the reduction process. Using the method of the invention, the hydrogen can be allowed to penetrate the full thickness of the glass article and thus reduce all the silver ion initially in the glass.

In one embodiment the invention is directed to a silver-containing visible light glass polarizer having a polarizing layer thickness in the range 10-40 μm in which the silver particles have a surround index sufficiently removed from the blue polarizer region to allow good contrast. One cannot use the normal methods known in the art to make a 460 nm blue polarizer, that is, methods that use silver halides because in silver halide containing glasses the silver halide moves the silver surface plasmon resonance to longer wavelengths. In such glasses the surround index is close to silver halide and the plasmon wavelength shifts to 480 nm making a blue polarizer impossible. The normal process consists of the steps:
1. Melting a glass batch containing a source of silver and a halogen other than fluorine, and forming a body from a melt;
2. Heat treating the glass body at a temperature above the glass strain point to generate halide crystals having a size in the range of 500-2000 Angstroms (Å);
3. Stressing the crystal-containing glass body at a temperature above the glass annealing point to elongate the body and thereby elongate and orient the crystals; and
4. Exposing the elongated body to a reducing atmosphere at a temperature above 250° C. to develop a reduced surface layer on the body that contains metal particles with an aspect ration of at least 2:1.

However, it has been discovered that if the silver is introduced into the glass composition as a non-halide silver salt and is reduced to form silver(0) particles prior to heating the glass body above the strain point, then it is possible to stretch a glass and the silver particles therein to form a polarizer effective at 460 nm.

When a glass melt is formed at high temperature using a silver salt, the high temperature melt contains Ag⁺¹ ions, and little or no Ag⁰ atoms. During cooling equilibrium shifts starts as shown by Equation 1. If one had "instant cooling" of a glass

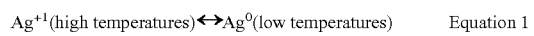
$$Ag^{+1}(\text{high temperatures}) \leftrightarrow Ag^0(\text{low temperatures}) \qquad \text{Equation 1}$$

melt, the equilibrium state between Ag⁺¹ and Ag⁰ in a cooled glass at ambient temperature would not represent the true equilibrium at that temperature. In order to establish a new equilibrium the glass must be reheated. However, the problem that arises is that after reheating one does not know how much Ag⁺¹ is converted into Ag⁰, and one also do not know the Ag⁰ particle size. There may in fact be a silver(0) particle size distribution. A much better method would be to make certain that all or substantially all of the Ag⁺¹ ions are converted to Ag⁰ by reduction with a reducing gas, for example, hydrogen, prior to stretching the glass to make the polarizer. Hydrogen reduction is done at a much lower temperature then the melt temperature of the glass or the temperature at which the glass is stretched to make a polarizing element. This lower temperature favors Ag⁰ in Equation 1. At the other end of the redox system, the H⁺ formed in reducing the Ag⁺¹ reacts to cleave an oxide bond, for example, Si—O—Si bond and form a SiOH species within the glass matrix.

In addition to the temperature aspect as described above, there is also a kinetic aspect in the formation of Ag⁰. In the Ag⁺¹ to Ag⁰ reduction step, in glass without the use of hydrogen reduction, the electron required to reduce $Ag^{+1}$ to $Ag^0$ has to come from some redox reaction that is occurring in the glass. As a result, one can say that the formation of $Ag^0$ from $Ag^{+1}$ is a function of the glass composition. [Typically, in other methods known in the art, a separate reducing agent such as a tin (II) salt or an antimony (III) salt is added to provide the electrons necessary to carry out the $Ag^{+1}$ to $Ag^0$ reaction. However, the use of these reducing agents is notoriously dependent on the thermal history of the glass; that is, heating rates, cooling rates, etc. Consequently, it would be preferable to avoid the use of reducing agents such as tin (II), antimony (III) and others known in the art.] Consequently, without hydrogen reduction one is uncertain regarding how much $Ag^{+1}$ is reduced to $Ag^0$. Using a reducing gas, for example hydrogen, according to the method taught herein reduces uncertainty. In accordance with the invention, the use of a hydrogen reduction step prior to heating and stretching the glass to make a polarizer ensures that all or substantially all of the $Ag^{+1}$ in a glass composition is reduced to a depth within the glass that is dependent on the time and temperature of the reduction step.

When hydrogen, or a hydrogen/inert gas mixture as described herein, is used as the reductant, the reduction of silver ion to silver(0) is not limited by the speed at which reduction reaction itself occurs. At the reduction temperatures described herein, silver ion is reduced to silver(0) by hydrogen as soon as the hydrogen reaches the silver ion. Thus, if one wants to reduce all the silver ion in a glass article at a given temperature, one must allow sufficient time for the hydrogen "front" to completely penetrate the glass. This fact also allows one to control the depth to which the reduction reaction occurs. That is, at a given temperature one can reduce silver ion to silver(0) to a selected depth in a glass article by controlling the time. In addition, one can also control the depth by changing the temperature at which the reduction is carried out. For a given time, as the temperature is raised the rate of reduction becomes faster and a greater depth can be achieved in a shorter time. Stated another way, if one wants to reduce the silver ion to a preselected depth, one can reach this depth in a shorter time by raising the temperature at which the reduction is carried out. One thus has three parameters (temperature, time and the hydrogen content of the reducing gas) that one can use to control the depth to which silver ion in a glass article is reduced to silver(0). When a hydrogen/inert gas mixture (forming gas) is used for reduction, at a given temperature and for a given time the greater the hydrogen content of the mixture the greater the depth to which silver ion will be reduced to silver(0). Herein a forming gas can have a hydrogen content from 6% to less than 100%, the balance being an inert gas that is preferably nitrogen.

The method of the invention can be used with any suitable borosilicate or aluminoborosilicate glass composition that is suitable for making optical polarizers provided that the glass composition is halide-free or substantially halide-free. Substantially halide-free means that, on a molar basis, the halide content of the glass is 10% or less than the silver content. Examples of suitable compositions can be found in the patents and patent applications cited above in the Background section of this specification. By way of example, without limiting the invention to this particular composition, one can use the exemplary composition shown in Table 1 that contains 0.05-1.0 wt/% Ag.

TABLE 1

| | (wt. %) |
|---|---|
| $SiO_2$ | 20-60 |
| $Al_2O_3$ | 12-20 |
| $B_2O_3$ | 10-25 |
| Ag | 0.05-1.0 |

In making the glass composition the Si, Al and B materials can be added as oxides (though other forms of these materials known in the art to be suitable for making glass can also be used) and Ag is added as a non-halide silver salt. Examples, without limitation, of such non-halide silver salts include silver nitrate, silver nitrite, silver carbonate, silver oxide or a mixture of any of the foregoing. Silver nitrate and silver oxide, including mixtures thereof, are the preferred silver salts. The amount of silver salt(s) added is sufficient to produce glass containing 0.05-1.0 wt. % silver calculated as silver(0). For the example given below, $SiO_2$, $Al_2O_3$, $B_2O_3$ and sufficient silver oxide to yield a silver content (as $Ag^0$ in the range of 0.05-1.0 wt. %) were melted in a quartz crucible at approximately 1350° C. for approximately 16 hours to produce a clear, slightly yellow glass (see FIG. 1, left side). The slightly yellow color of the glass indicates that substantially all of the silver is dissolved in the glass composition as the silver(+1) ion. The glass also fluoresces under ultraviolet light indicating that at least some of the silver is present as reduced silver, that is, $Ag^0$.

Once the melt has been completed, the glass is than shaped prior to hydrogen treatment and drawing (stretching). For example, the molten glass can be poured into a mold and cooled (or a glass boule is formed from a melt, cooled and then cut into the desired shape for example, a bar, for drawing), and then Blanchard ground into bars, for example bars that are approximately 25-100 cm long, 7.5-10 cm wide and 0.5-1.5 cm thick. To allow higher draw forces on the glass, before drawing an optional etching step or an optional thermal treatment step, or both, can be used to remove and/or heal surface and subsurface defects; for example, but not limited to, subsurface defects that may be introduced during the grinding process. When a glass surface is mechanically removed (for example by grinding), many surface and/or subsurface fractures or flaws can either result or become exposed. Under an applied stress these fractures or flaws can propagate into the glass body causing the glass to fracture. By chemically etching and/or thermally treating the glass surface the flaws are healed by rounding out the fracture (flaw) surface, or by closing it using a thermal treatment. Thermal treatments are generally carried out at a temperature near (within 25-50° C.) the softening point of the glass composition. As an example of etching, prior to drawing (stretching) the glass, the glass bar is immersed in a dilute hydrofluoric acid solution for a period of time sufficient to remove a portion of the surface having contamination and flaws. If deemed necessary, visual inspection, with or without the use of magnification, can be used to determine when the process is completed.

Subsequently, with or without the optional etching and/or thermal treatment, the glass bars are placed in a hydrogen reduction furnace (using pure hydrogen in this instance) for a time in the range of 25-150 hours at a temperature in the range of 300-600° C. to reduce the silver(+1) ion ($Ag^{+1}$) ion to silver(0), that is, $Ag^0$. Preferably the reduction is carried out for a time in the range of 40-100 hours at a temperature in the range of 350-500° C. The initial reduction of surface $Ag^{+1}$ in the bar proceeds very quickly. The exact length of time the bar will undergo hydrogen treatment will depend on the depth to which one wants to reduce silver ion to silver(0) and the temperature at which the hydrogen treatment is carried out. Empirically, the inventors have found that to reduce silver ion to a depth of 150 µm requires approximately 40 hours at a temperature of 420° C. To reduce silver ion to a greater depth within the glass one can increase the reduction time, increase the reduction temperature, or increase both. While one can reduce all the silver ion in a bar, this is not necessary to make a visible light optical polarizer according to the invention. Once sufficient reduction has occurred, the glass bars are then drawn-under conditions where the draw temperature allows a glass viscosity greater than $10^6$ poise and a pulling velocity that is sufficient to apply a force greater than 3500 psi (>3500 psi) to elongate the silver particles. FIG. 1 illustrates a glass bar as poured on the left and a glass bar after treating in a reducing atmosphere on the right. The darker color of the bar on the right is due to the presence of silver(0) after reduction. The unreduced bar on the left is light yellow in color, indicating the silver in the bar is substantially silver (+1).

The invention is useful for making silver-containing visible light optical polarizers having a polarizing layer thickness in the range of 10-40 µm that can polarize light having a wavelength in the range 380-700 nm. In order to make such polarizers, before the glass is stretch into a ribbon, the silver in the glass should be reduced to a depth that is dependent on the thickness of the desired polarizing layer and degree to which the glass will be stretched. Thus, if the polarizing layer of the stretched glass is to have a thickness of 10 µm and the glass is to be stretched by a factor of five (5), then the initial thickness of the reduced silver layer before stretching takes place should be 50 µm. If the initial glass is to be stretched by a factor of ten (10), then the initial thickness of the reduced silver layer should be 100 µm. To make a 40 µm polarizing layer after stretching a glass by a factor of ten (10), the initial thickness of the reduced layer should be 400 µm. Thus, the thickness of the polarizing layer in the stretched glass is dependent on both the thickness of the reduced silver layer in the glass before stretching and the factor by which the glass is stretched according to the Equation $$Ag^0 \text{ Thick-}AS = Ag^0 \text{-}BS \div SF$$

Changing either $Ag^0$–BS or SF or both, according to the Equation enables one to make polarizers having a polarizing layer of any thickness, for example, thickness greater or smaller than the 10-40 µm range stated above.

Figure 2:
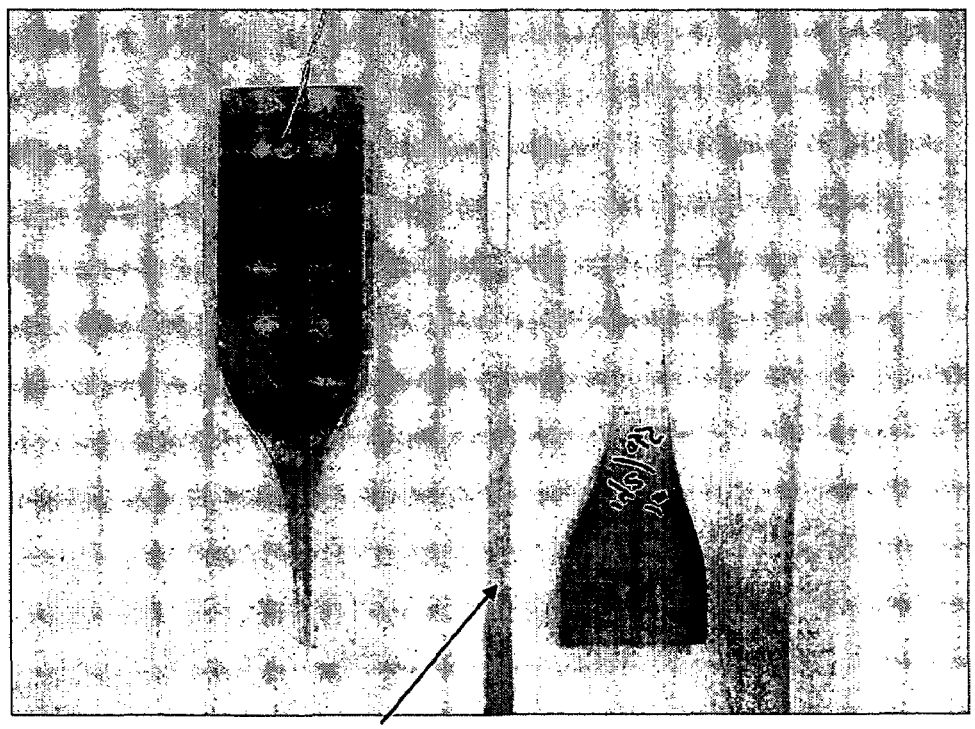
FIG. 2 illustrates a visible light glass bar after drawing on the right, drawn glass ribbon in the middle, and a root or gob of glass from start-up on the right.
Figure 3:
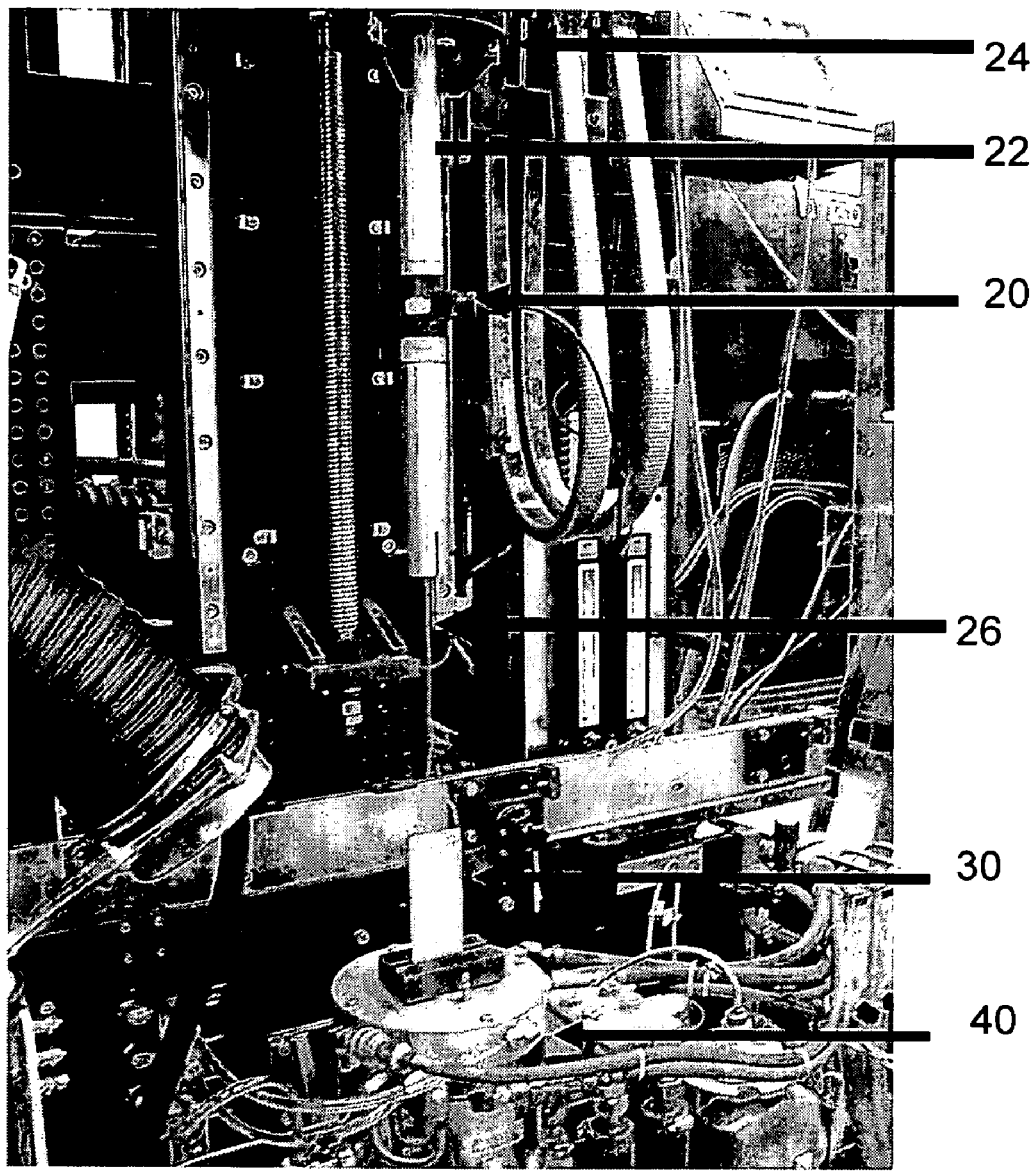
FIG. 3 illustrates a furnace, load cell and glass bar suspended in the furnace.

The process according to the invention was developed to allow a high through-put of different glass compositions. The AMPL (for Corning's Advanced Material Processing Laboratory) draw tower (purchased from Heathway Ltd, now Herbert Arnold GmbH & Co. KG, Weilburg, Germany) as shown in FIG. 3 is comprised of a downfeed system, furnace 40 and pulling tractors (not illustrated) that were used to stretch-down glass bars 30 under high tension. Various glass compositions were melted in a crucible then poured into a bar form using a mold. The bars were then either machined finished or used as-poured in the drawing process (see FIGS. 1 and 2 described below). Prior to drawing the bars were reduced in a hydrogen atmosphere as described above. For the testing described herein, the bars 30 are approximately 5 cm wide by 10 to 100 cm long, and were of varying thicknesses in the range of 0.6 to 1.5 cm. Holes were drilled on each end of the bars (see FIG. 2 illustrating one end of a bar); one hole being used to hang the bar from a metal cylinder 22 on the downfeed system and the other hole was used to grasp the bar to start the drawing process. As illustrated in FIG. 3, a load cell 20 was attached to a metal cylinder 22 that was held in the place in the downfeed chuck 24 and the other end of the load cell 20 supported the glass bar 30. The furnace 40 was a graphite resistance furnace that can span a wide temperature range. The furnace 40 was controlled using a pyrometer and programmable controller. The glass bar 30 was suspended in the furnace 40 by a wire 26 connected to the metal cylinder 22 plus load cell 20 as shown in FIG. 3.

After placing the $H_2$_reduced bar in the furnace, the furnace temperature was raised to a temperature at which the glass was soft enough to enable pull-down. For the exemplary composition given above, a temperature in the range of 650-725° C. was used for drawing (stretching) the glass. Once the glass bar 30 was initially pulled down, the downfeed which lowers the glass bar 30 into the furnace at a controlled rate was started. The feed rate of lowering the glass down was set at 13 mm/min. The tractor unit is comprised of two motor driven belts (located below the furnace) opposing each other and rotating in opposite directions so that the motion through the belts is downward. The distance between the belts can be set so that the glass being drawn (stretched) through can be grasped by the belts and does not slip in the belts. The bars were drawn down to form a ribbon 60 (see FIG. 2) having a polarizing glass layer with a thickness in the range of 10-40 µm. After drawing and cooling, the ribbon 60 was cut into the proper sizes for their intended applications; for example, optical polarizers in telecommunications equipment.

In preparing an optical polarizer according to the invention, it is necessary that the thickness of the silver(0) layer in the glass before drawing be sufficient so that when the glass is drawn down there is a sufficient quantity of "polarizing glass" (the polarizing glass layer) to effect polarization. For example, if the polarizing layer in the glass after stretching is to be 10 µm thick, and the glass bar or other form used to make the polarizer has its thickness reduced by a factor of ten (10), then the thickness of the polarizing layer in the bar or other form before drawing must be 100 µm thick in order to achieve a 10 µm thickness in the final polarizer. Further, since the diffusion of a reducing gas (for example, hydrogen) through glass is a slow process, when a "thick" glass bar or other form is reduced before draw-down, sufficient time must be allowed for hydrogen diffusion through the glass and for the reduction of $Ag^{+1}$ to $Ag^0$ to occur. Lastly, since it is desirable in some application, for example, in telecommunications applications, that the polarizer is as thin as possible, it is also desirable that the amount of $Ag^{+1}$ reduced to $Ag^0$ is maximized. The methods according to the invention achieve this result.

Figure 4:
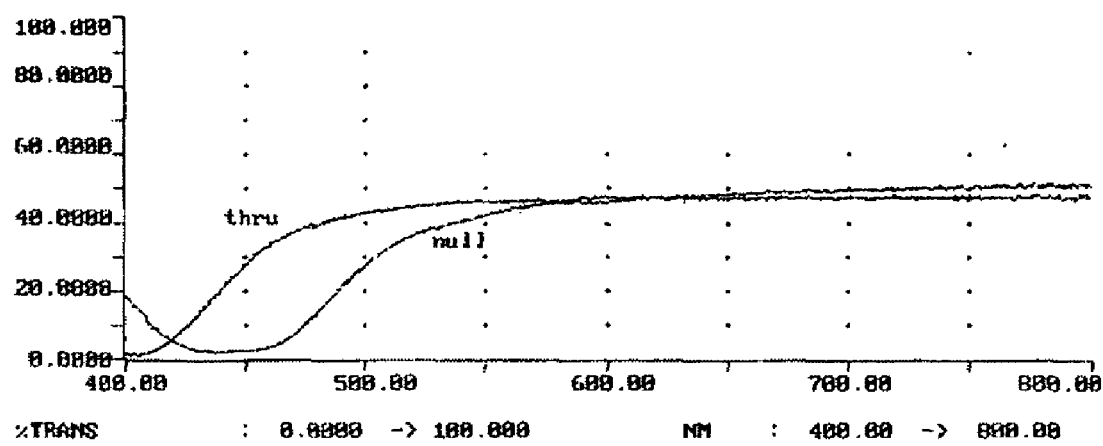
FIG. 4 illustrates the polarized transmittance of a drawn ribbon of glass that was treated in a reducing hydrogen atmosphere before drawing (stretching).

FIG. 4 illustrates the polarized transmittance of a drawn ribbon of glass that was treated in a hydrogen atmosphere at 500° C. for 50 hours before drawing into a ribbon as illustrated in FIG. 2. The ribbon was not polished prior to measuring transmittance. Using a baseline of 50% transmittance because of poor surface finish, the through ("thru" in FIG. 4) transmittance at 450 nm is approximately 70%. The load cell reading, which is indicative of the load applied during the draw, was relatively low indicating the one not need to apply a large amount of stress to attain sufficient elongation of the silver particles. However, it was noted during the course of numerous experiments that load cell reading below 10 produced significantly decreased polarization behavior in the final product.

Figure 5:
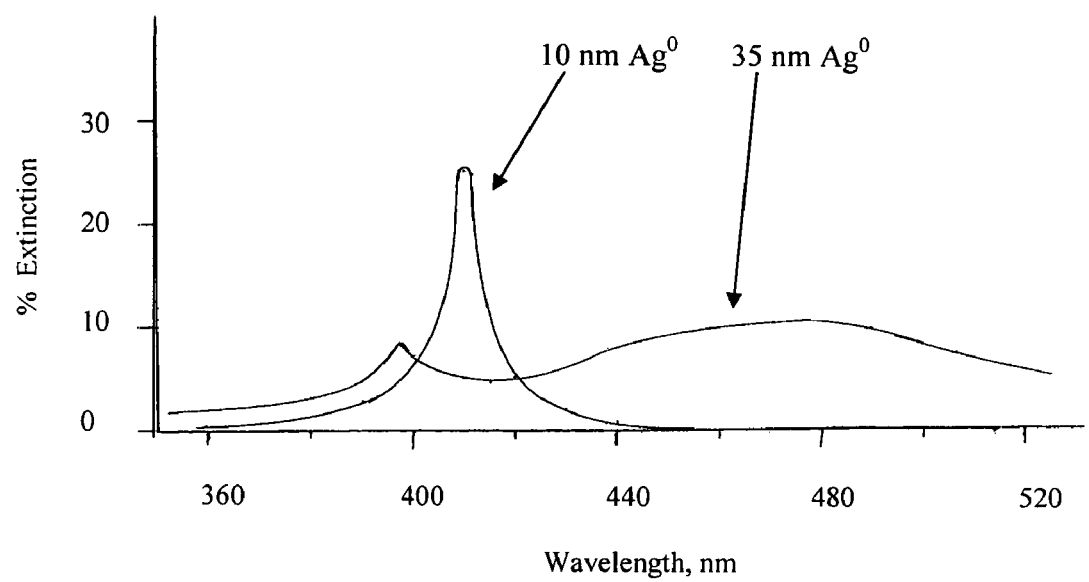
FIG. 5 illustrates theoretical extinction (absorbance) curves for 10 nm and 35 nm particles in the visible light region 360-520 nm

Referring w to FIG. 5, the graph illustrates theoretical calculation for the extinction (the sum of absorbance+scattering) of visible light in the 360-520 nm range (blue/green part of the spectrum) for 10 nm and 35 nm $Ag^0$ particles. As the graph illustrates, the extinction for the 35 nm particles broad, spreading over the entire range and thus rendering a polarizer having particles in this range inefficient in the blue/green part of the spectrum due to high extinction. In contrast, the extinction for the smaller sized 10 nm particles is essentially confined to the 400-420 nm range, being below 2-3% at wavelengths above and below this range. A polarizer having a narrow distribution of 10 nm particles would thus be more transmissive in the blue/green region which extends from approximately 470 nm to approximately 510 nm. The present invention enables one to make such a blue/green visible polarizer because it enables one to control the size of the $Ag^0$ articles in the polarizer to a narrow range. The broader absorbance spectrum of the 35 nm particles is similar to the absorbance that is observed for polarizers that are made using thermal reduction.

Figure 6:
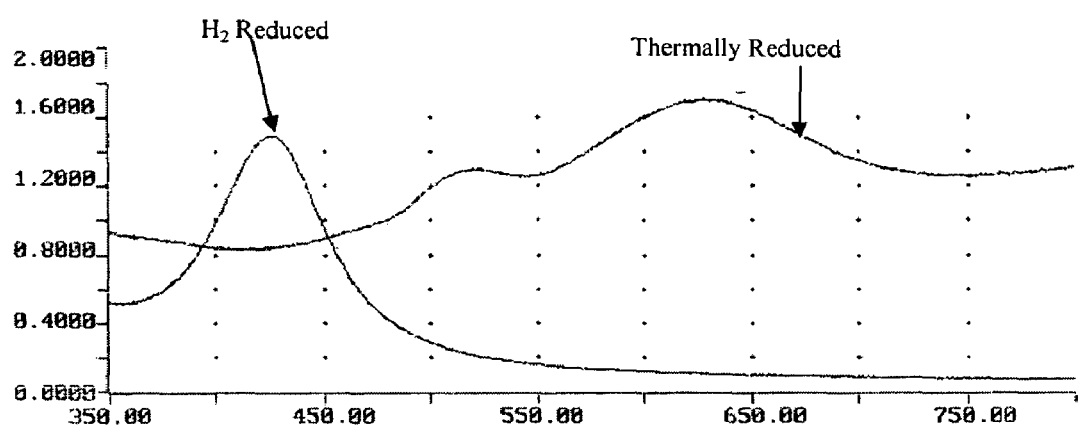
FIG. 6 illustrates the extinction (absorbance) curves for polarizers in which silver is hydrogen-reduced and thermally reduced

Referring to FIG. 6 illustrates extinction (absorbance) of $Ag^0$ particles formed by $H^2$ reduction according to the present invention and thermal reduction. The $Ag^0$ formed by hydrogen reduction are controllably mono-dispersed and small. In contrast, the particles formed by thermal reduction have a particle size extending over a wide range. Consequently, the thermally reduced particles absorb over a wide range of wavelengths making a visible light (400-700 nm) polarizer, and especially a blue/green light polarizer, impractical. As shown in FIG. 6, the polarizer made using the hydrogen reduction method according to the invention has only a small rbance in the approximate 470 nm to approximately 515 nm blue/green visible light region. It should be noted that the hydrogen reduced and thermally reduced curves of FIG. 6 almost exactly mimic the 10 nm and 35 nm curves, respectively, illustrated in FIG. 5.

The reducing atmosphere can be a hydrogen atmosphere or a hydrogen/inert gas atmosphere containing 6 vol. % hydrogen or more, preferably greater than 10 vol. % hydrogen. A 100% hydrogen atmosphere is preferred. [Herein such hydrogen/inert gas mixtures are referred to as a "forming gas." When such gas mixtures are used to practice the invention, the time for which the reduction is carried out should be increased as the percentage of hydrogen in the gas becomes less. The exact length of time for reduction using a selected forming gas composition can be determined without undue experimentation by placing a number of glass samples in the reduction furnace and using the selected forming gas composition to reduce silver in the samples. A glass sample is periodically removed, cooled and the depth of silver measured.]

EXAMPLE $SiO_2$, $Al_2O_3$, $B_2O_3$ and sufficient silver oxide to yield a silver content (as $Ag^0$ in the range of 0.05-1.0 wt. %) were melted in a quartz crucible at approximately 1350° C. for approximately 16 hours to produce a clear, slightly yellow glass. The slightly yellow color of the glass indicates that substantially all of the silver is dissolved in the glass composition as the silver(+1) ion. The glass also fluoresces under ultraviolet light indicating that at least some of the silver is present as reduced silver, that is, $Ag^0$.

The glass melt was poured into a several molds to form a bars that were 50 cm long, 7.5 cm wide and 1 cm thick. After cooling, the bars were Blanchard ground, etched and thermally treated to form a bar as illustrated in FIG. 1, left side. The bars were then placed in a hydrogen reduction furnace and hydrogen reduced for 40 hours at a temperature of 420° C. to produce a bar looking like that illustrated in FIG. 1, right side. The depth of the silver reduction was determined by sawing one bar across its width and analyzing the cross section. It was determined that silver ions were reduced to silver (0) to depth of 125 µm. Another bar was stretched using the drawing tower illustrated in FIG. 3. A 5-1 stretch was performed; that is, a 1 cm portion of the bar was stretched to a 5 cm. After the stretching was completed the thickness of the polarizing layer was determined and was found to be approximately 22 µm. FIG. 4 illustrates the transmission spectrum (uncorrected) of the visible light optical polarizer that is thus formed.

In an additional embodiment the invention is directed to a method of making a silver (0) containing visible light optical polarizer having a polarizing layer of preselected thickness, said method comprising the steps of:

preparing a glass melt batch containing a non-halide silver salt, the amount of silver salt in the melt being sufficient to produce a glass having a silver content in the range of 0.05-1.0 wt. % calculated as silver(0);

preparing a glass form suitable for drawing into a ribbon;

treating the glass form in a reducing atmosphere of hydrogen for a time and a temperature below the softening point of the glass sufficient to reduce the silver in the glass to silver(0) to a preselected depth;

stretching the glass form by a preselected stretch factor into a ribbon having a preselected polarizing layer thickness, said stretching being done using any method knowing in the art;

polishing the ribbon; and cutting the ribbon to the desired size to thereby form a visible light optical polarizer;

wherein the treatment in the reducing atmosphere is carried out after the melt has been cast into a form and before the form is stretched into a ribbon; and the glass composition has a halide content that is, on a molar basis, 10% or less than the silver content of the glass; and the preselected polarizing layer thickness is determined according to the Equation $Ag^0-AS=Ag^0-BS \div SF$, wherein $Ag^0-AS$ is the preselected thickness of the polarizing layer in the glass after stretching, $Ag^0-BS$ is the preselected depth of the reduced silver(0) in the glass before stretching, and SF is the preselected stretch factor. In an embodiment $Ag^0-BS$ and SF are selected such that $Ag^0-AS$ is in the 10-40 µm range after stretching. Further, in an embodiment the time is in the range of 25-150 hours and the temperature is in the range 400-600° C.

In yet a further embodiment, the invention is directed to a method of making a silver(0) containing visible light optical polarizer having a polarizing layer in the range of 10-40 µm, said method comprising the steps of:

preparing a glass melt batch containing a non-halide silver salt, the amount of silver salt in the melt being sufficient to produce a glass having a silver content in the range of 0.05-1.0 wt. % calculated as silver(0);

preparing a glass form suitable for drawing into a ribbon;

treating the glass form in a reducing atmosphere hydrogen for a time in the range of 40-100 hours and at a temperature in the range of 350-500° C.;

stretching the glass form into a ribbon using any method knowing in the art;

polishing the ribbon; and cutting the ribbon to the desired size to thereby form a visible light optical polarizer;

wherein the treatment in the reducing atmosphere is carried out after the melt has been cast into a form and before the form is stretched into a ribbon;

the glass composition has a halide content that is, on a molar basis, 10% or less than the silver content of the glass; and wherein the polarizing layer thickness is determined according to the Equation $Ag^0-AS = Ag^0-BS \div SF$, wherein $Ag^0-AS$ is the thickness of the polarizing layer in the glass after stretching, $Ag^0-BS$ is the depth of the reduced silver(0) in the glass before stretching, and SF is the stretch factor; and $Ag^0-BS$ and SF are selected such that after stretching the polarizing layer thickness is in the range 10-40 μm. In an additional embodiment SF is in the range of 5-10.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A visible light optical polarizer made by a process comprising:

preparing a glass melt batch containing a non-halide silver salt, the amount of the silver salt in the melt being sufficient to produce a glass having a silver content in the range of 0.05-1.0 wt % calculated as silver(0);

preparing a glass form suitable for drawing into a ribbon;

treating the glass form in a reducing atmosphere for a time in the range of 25-100 hours and a temperature below the softening point of the glass, wherein the reducing atmosphere is hydrogen;

stretching the glass form into a ribbon having a polarizing layer containing elongated silver(0) particles using any method known in the art;

polishing the ribbon; and cutting the ribbon to the desired size to thereby form the visible light optical polarizer;

wherein the treatment in the reducing atmosphere is carried out after the melt has been cast into a form and before the form is stretched into a ribbon, and the glass composition has a halide content that is, on a molar basis, 10% or less than the silver content of the glass.

2. A visible light optical polarizer made by a process comprising:

preparing a glass melt batch containing a non-halide silver salt, the amount of the silver salt in the melt being sufficient to produce a glass having a silver content in the range of 0.05-1.0 wt % calculated as silver(0);

preparing a glass form suitable for drawing into a ribbon;

treating the glass form in a reducing atmosphere of hydrogen for a time and a temperature below the softening point of the glass sufficient to reduce the silver in the glass to silver(0) to a preselected depth, wherein the time is in the range of 25-150 hours and the temperature is in the range of 400-600° C.;

stretching the glass form by a preselected stretch factor into a ribbon having a polarizing layer with a preselected polarizing layer thickness, said polarizing layer containing elongated silver(0) particles, said stretching being done using any method known in the art;

polishing the ribbon; and cutting the ribbon to the desired size to thereby form the visible light optical polarizer;

wherein the treatment in the reducing atmosphere is carried out after the melt has been cast into a form and before the form is stretched into a ribbon, the glass composition has a halide content that is, on a molar basis, 10% or less than the silver content of the glass, and the preselected polarizing layer thickness is determined according to the Equation $Ag^0-AS = Ag^0-BS \div SF$, wherein $Ag^0-AS$ is the preselected thickness of the polarizing layer in the glass after stretching, $Ag^0-BS$ is the preselected depth of the reduced silver(0) in the glass before stretching, and SF is the preselected stretch factor.

3. A visible light optical polarizer made by a process comprising:

preparing a glass melt batch containing a non-halide silver salt, the amount of the silver salt in the melt being sufficient to produce a glass having a silver content in the range of 0.05-1.0 wt % calculated as silver(0);

preparing a glass form suitable for drawing into a ribbon;

treating the glass form in a reducing atmosphere hydrogen for a time in the range of 40-100 hours and at a temperature in the range of 350-500° C.;

stretching the glass form into a ribbon using any method known in the art;

polishing the ribbon; and cutting the ribbon to the desired size to thereby form the visible light optical polarizer;

wherein the treatment in the reducing atmosphere is carried out after the melt has been cast into the form and before the form is stretched into a ribbon;

the glass composition has a halide content that is, on a molar basis, 10% or less than the silver content of the glass; and wherein the polarizing layer thickness is determined according to the Equation $Ag^0-AS = Ag^0-BS \div SF$, wherein $Ag^0-AS$ is the thickness of the polarizing layer in the glass after stretching, $Ag^0-BS$ is the depth of the reduced silver(0) in the glass before stretching, SF is the stretch factor, and $Ag^0-BS$ and SF are selected such that after stretching the polarizing layer thickness is in the range of 10-40 μm.

* * * * *

UNITED STATES PATENT AND TRADEMARK OFFICE
CERTIFICATE OF CORRECTION

PATENT NO. : 7,618,908 B2 Page 1 of 1
APPLICATION NO. : 11/314874
DATED : November 17, 2009
INVENTOR(S) : Borrelli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this

Twenty-sixth Day of October, 2010

David J. Kappos
*Director of the United States Patent and Trademark Office*